July 7, 1936.  E. D. WILSON ET AL  2,046,714

COLOR MATCHER

Filed July 19, 1934

WITNESSES:
C. J. Weller
Wm. C. Groome

INVENTORS.
Earl D. Wilson &
Carl C. Hein.
BY
ATTORNEY

Patented July 7, 1936

2,046,714

UNITED STATES PATENT OFFICE 2,046,714

COLOR MATCHER

Earl D. Wilson and Carl C. Hein, Wilkinsburg, Pa., assignors to Westinghouse Electric & Manufacturing Company, East Pittsburgh, Pa., a corporation of Pennsylvania Application July 19, 1934, Serial No. 736,029

3 Claims. (Cl. 88—14)

Our invention pertains to a color matching device and more particularly to a device for comparing the color of a sample to the color of a standard.

It is an object of our invention to provide a color matcher whereby the colors of samples may be accurately compared with the color of a standard independently of the different color response of different operators and irrespective of the surface gloss of the different materials.

It is also an object of our invention to provide a sensitive color matcher with suitable sensitivity adjustments whereby it may be adjusted for matching either dark or bright colors over a wide range of the spectrum.

It is a further object of our invention to provide an improved color matcher of simple rugged construction and operation.

In accordance with our invention, colored light is projected upon a sample, and only that portion of the light which is diffusely reflected impinges upon a photo-cell which controls an amplifier and an indicating microammeter. The source of light is a tungsten filament incandescent electric lamp which, in conjunction with three color filters, provides red, green and blue light. A voltage regulator is interconnected between the alternating current service line and the device to eliminate the variability of illumination.

In our device a special integrating chamber is provided wherein only the diffused light from the sample impinges upon the photo-cell. Although the indicating micro-ammeter has a scale of limited length, say about 2.4 inches, this is only a small fraction of the total range available since the adjustment of the special sensitivity controls provided enables the operator to place this scale in the exact range which is to be used. Instruments giving a zero to one hundred reading on a single range scale can not give readings which are sufficiently accurate for matching similar materials. In accordance with our invention the photo-cell is preferably of the caesium oxide type which in conjunction with the tungsten filament affords desirable operating characteristics over a wide range of the spectrum.

Figure 1:
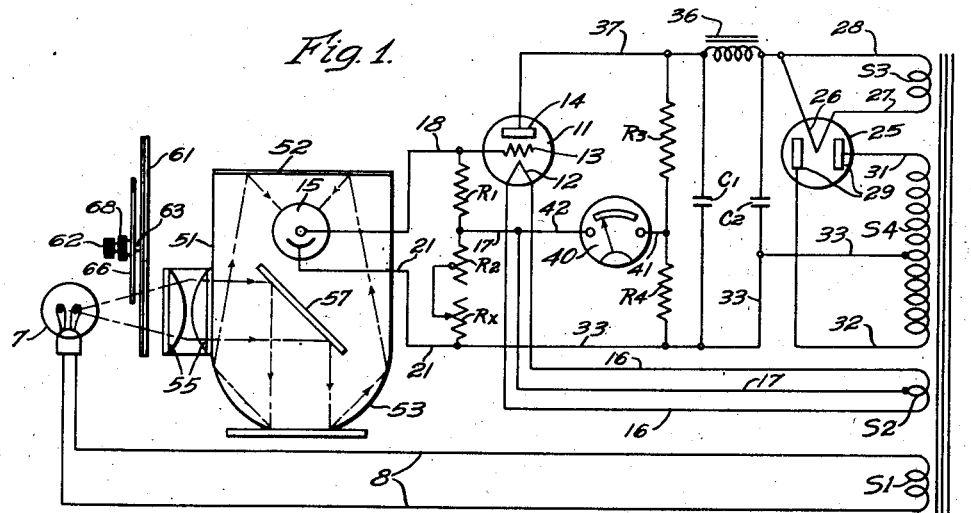
Figure 2:
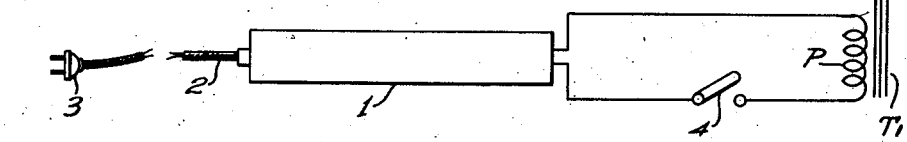
Figure 2:
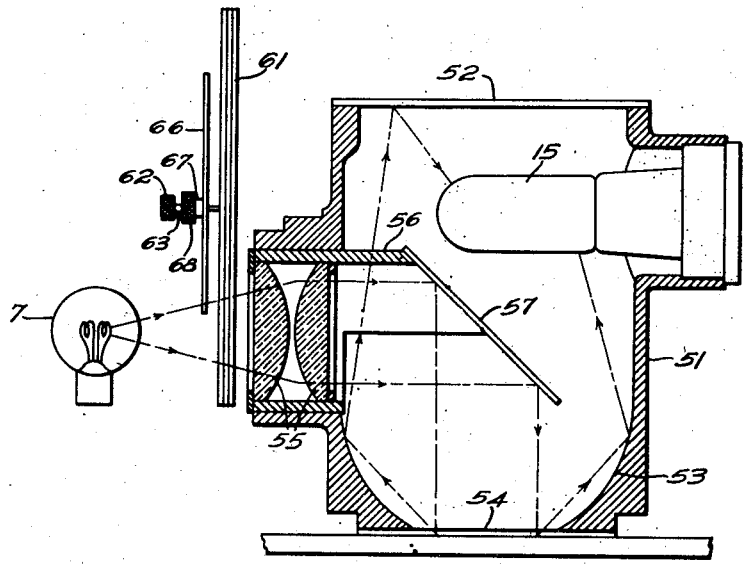

The invention itself, however, both as to its organization and its method of operation, together with additional objects and advantages thereof, will best be understood from the following description when read in conjunction with the accompanying drawing, in which Figure 1 is a diagrammatic view representing the electrical and mechanical relation of the operative elements of our color matcher; and Fig. 2 is a view in vertical section illustrating the construction of the integrating chamber shown in relation with the light source, the adjustable shutter, and the adjustable color screen.

Referring more specifically to the drawing, our apparatus comprises a power transformer T1, the primary winding P of which is energized through a voltage regulator 1 by a cord 2 and plug 3 which may be conveniently plugged into any alternating current service outlet. The voltage regulator may be of the saturated core type which will regulate the voltage sufficiently for ordinary fluctuations and is adjustable in the usual manner. The frequency of the alternating current energizing current should be reasonably constant which is true of most of the power systems from which electric clocks can be properly operated. A manually actuable switch 4 may be provided for convenience in controlling the color-matcher, but the voltage regulator should also be disconnected by pulling out the plug 3 when the device is not in use.

The light for operating our color matcher is supplied by a tungsten filament incandescent lamp 7 which may be a 32 candle power double-filament automobile bulb. Only one filament is used at a time and it is energized by a pair of conductors 8 extending from the lamp socket to a secondary winding S1 on the transformer T1.

An amplifier tube 11 is used in our color matcher which is of the type sold on the open market as the RJ-550. This is a special tube comprising a cathode filament 12, control grid 13 and anode plate 14 and in which the grid current is exceptionally low. The low grid current characteristic of this tube is very important with the minute response given from the photo-cell 15 when matching colors. The filament 12 of the amplifier tube is heated by current from a center tapped secondary winding S2 to the terminals of which it is connected through suitable conductors 16. The center tap on the heater winding S2 is connected to the grid of the amplifier tube through a conductor 17 and a suitable high resistance resistor R1.

One electrode of the photo-cell 15 is connected to the grid of the amplifier tube by a conductor 18. The other electrode of the photo-cell is connected by a conductor 21 through a variable resistor RX and a fixed resistor R2, thence to the filament 12 of the amplifier by way of conductors 17 and 16. These resistors are also included in the plate return connection of the amplifier tube whence the IR drop serves to bias the photo-cell. The variable resistor RX serves as a sensitivity control by which the sensitivity of the device may be varied over a wide range and it is preferably adjusted by means of a convenient knob mounted upon a panel in any suitable manner.

For energizing the anode plate of the amplifier tube a double plate rectifier tube 25 is provided with its filament 26 energized through conductors 27 and 28 from a suitable low voltage secondary winding S3 on the transformer. A center tapped high voltage secondary winding S4 is also provided on the transformer for energizing the plates 29 of the rectifier tube through suitable conductors 31 and 32 and the center tap is connected to the filament 12 of the amplifier tube through a conductor 33 extending to the resistors RX and R2 thence by way of conductor 17 to the center tap on the heater winding S2 and by way of conductors 16 to the filament 12.

The rectifier filament 26 is connected to the anode plate of the amplifier through a choke coil 36 and a conductor 37. By-pass condensers C1 and C2 are connected from the ends of the choke coil 36 to the plate return conductor 33. A pair of resistors R3 and R4 are connected in series across the anode circuit of the amplifier tube between the anode conductor 37 and the plate return connection 33. The indicating instrument comprises a micro-ammeter 40 which is energized by a circuit comprising a connection 41 extending from between the anode resistors R3 and R4 to the instrument thence by way of conductors 42, 17 and 16 to the filament of the amplifier tube.

The photo-cell 15 is mounted in a suitable socket adjacent one end of an integrating chamber 51 which is of substantially cylindrical formation. The integrating chamber is open at both ends one of which is provided with a flat cover plate 52, and restricted end walls 53 are provided around the opening 54 at the other end. An aperture in an intermediate portion of the wall of the integrating casing supports lenses 55 to project light into the casing from the lamp 7 which is mounted adjacent thereto. A bracket 56 extends into the casing to support a reflector 57 in a suitable angular position for projecting the projected light toward the orifice in the restricted end of the chamber. The reflector is so positioned and of such a size that it shields the photo-cell 15 from light reflected directly from a sample adjacent the opening 54. A film of white reflecting material is provided on the exposed inner surfaces of the chamber.

A plurality of color filters are supported by a disk 61 which is pivotally mounted between the lamp 7 and the integrating chamber 51 in such a position that any selected color filter may be conveniently interposed therebetween for projecting light of a corresponding color into the chamber by adjusting the position of the disk 61. A knob 62 is provided on a shaft 63 extending from the disk 61 to provide a convenient adjusting control. A gradually variable shutter 66 is also interposed between the lamp 7 and the chamber 51 for cutting down the projected light to vary the sensitivity of the device as desired. The shutter 66 may comprise a non-circular plate having a spiral cam periphery or it may comprise a circular disk having suitable apertures for controlling the admission of light. For convenience the shutter member 66 is preferably journalled on a tubular shaft 67 which is concentrically disposed on the color filter shaft 63 and terminates in a knurled knob 68. The concentric shafts may for convenience be extended through a panel (not shown). A suitable housing is provided for enclosing and protecting the elements of the color matcher but this structure has been omitted for clearness. The principal characteristics of such a housing are that it should should be rigid, light and compact and it should have a window adjacent the orifice 54 in the restricted end of the integrating casing 51.

The photo-cell 15 is preferably of the caesium oxide type which in conjunction with the light emitted by the tungsten filament of the lamp 7 has been found to provide very desirable characteristics for color matching.

In operation the device may be placed on the sample or the sample may be placed on the device. In the latter case a weight should be placed on top of the sample. In either case it is important to use either an opaque sample so that external light can not enter or several thicknesses of the sample, or a sample backed by some opaque material. The sample should completely cover the window.

With the standard in position, observations are taken for each colored light available by changing the color filters. The same observations are repeated with each sample in place.

It is preferable to adjust the indicator to the center of the scale for each color as applied to the standard. This is readily accomplished by varying resistor RX for a rough adjustment and the shutter 66 for a fine adjustment. With the same adjustment for each color of light the sample is then tested. If the sample checks within 10% of the center deflection, it is a very close color match.

It is apparent that various changes and modifications may be made in the nature, the mode of operation, and the details of our system without departing from the spirit thereof. We desire, therefore, that only such limitations shall be imposed thereon as are necessitated by the prior art or the scope of the appended claims.

We claim as our invention:

1. In a device for measuring a reflection characteristic of a surface to be tested, an integrating chamber having a pair of apertures lying upon axes intersecting within the chamber, said chamber having a light-reflecting inner surface, a photo-responsive element mounted in said chamber, and screening means arranged to prevent direct illumination of said photo-responsive element from either of said apertures, said screening means including a light-deflecting element mounted adjacent the intersection of said axes and arranged to deflect light from one of said axes substantially to the other of said axes.

2. In a device for measuring a reflection characteristic of a surface at a plurality of spectral regions, an integrating chamber having a pair of apertures lying upon axes intersecting within the chamber, said chamber having a light-reflecting inner surface, a photo-responsive element mounted on said chamber, screening means arranged to prevent direct illumination of said photo-responsive element from either of said apertures, said screening means including a light-deflecting element mounted adjacent the intersection of said axes and arranged to deflect light from one of said axes to the other of said axes, a source of light arranged to project a beam of light along one of said axes upon said deflecting element, said source having energy components in the spectral regions in which measurements are to be taken, and means for selectively modifying the energy distribution of said beam in said spectral regions.

3. In a device for measuring a reflection characteristic of a surface at a plurality of spectral regions, an integrating chamber having a pair of apertures lying upon axes intersecting within the chamber, said chamber having a light-reflecting inner surface, a photo-responsive element mounted in said chamber, screening means arranged to prevent direct illumination of said photo-responsive element from either of said apertures, said screening means including a light-deflecting element mounted adjacent the intersection of said axes and arranged to deflect light from one of said axes to the other of said axes, a source of light arranged to project a beam of light along one of said axes upon said deflecting element, said source having energy components in the spectral regions in which measurements are to be taken, a plurality of absorption filters of different transmission characteristics for modifying the energy distribution of light supplied from said source to said photo-responsive element, and means for selectively interposing said filters in the optical path between said source and said photo-responsive element.

EARL D. WILSON.
CARL C. HEIN.